O. STODDARD.
Corn Husker.
No. 15,047.
Patented June 3, 1856.
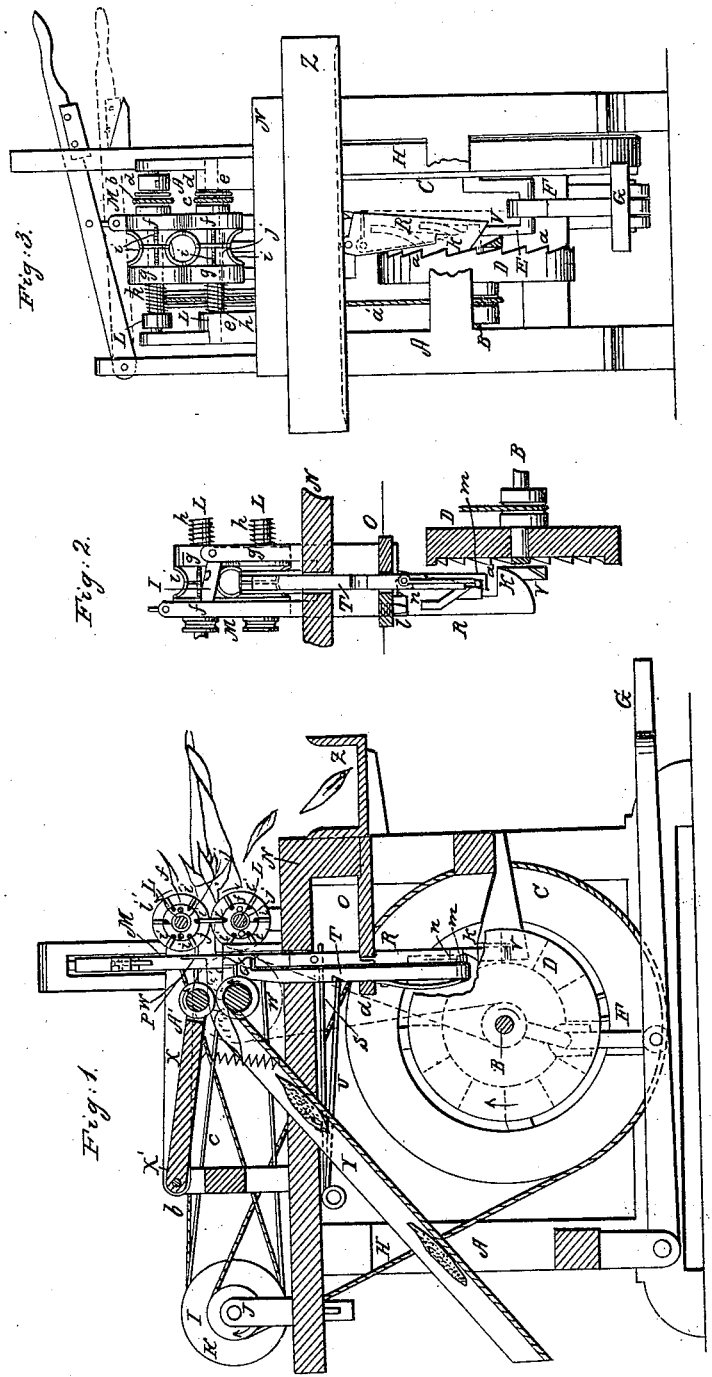

UNITED STATES PATENT OFFICE.

OREN STODDARD, OF BUSTI, NEW YORK.

MACHINE FOR HUSKING CORN.

Specification of Letters Patent No. 15,047, dated June 3, 1856.

*To all whom it may concern:*

Be it known that I, OREN STODDARD, of Busti, in the county of Chautauqua and State of New York, have invented a new and Improved Machine for Husking Corn; and I do hereby declare that the following is a full, clear, and exact description of the same, reference being had to the annexed drawings, making a part of this specification, in which—

Figure 1, is a longitudinal vertical section of my improvement the plan of section being through the center. Fig. 2, is a detached front view of the mechanism by which the ears of corn are cut from the stalks. Fig. 3, is a front elevation of my improvement.

Similar letters of reference indicate corresponding parts in the several figures.

My invention consists in the employment or use of stripping rollers, and a cutting device for cutting the ears of corn from the stalks, the above parts being arranged and operating as will be hereinafter fully shown and described, whereby the ears of corn are husked, cut from the stalks and discharged from the machine at separate points.

To enable those skilled in the art to fully understand and construct my invention, I will proceed to describe it.

A represents a rectangular frame constructed of any proper material and in any proper manner to support the working parts.

B represents a shaft which is placed transversely in the lower part of the frame A and has a fly wheel C upon it and also a wheel D, said wheel being provided with ratchet shaped teeth or projections ($a$) on one side near its periphery. The shaft B has a crank E at its center to which crank a pitman F is attached, the pitman being connected to a treadle G.

Around the fly wheel C a band H passes, said band also passing around a pulley I on a shaft J on the upper part of the frame A. The shaft J has a double grooved pulley K upon it around which the cords ($b$) ($c$) pass. These cords pass around pulleys ($d$) ($d$) on shafts L L. The journals are fitted in uprights ($e$) ($e$) on the front part of the frame A, and the journals of the upper rollers are fitted in the end of a swinging frame A'. The shafts L L are placed one above the other and have each a stripping roller placed on them. These stripping rollers are formed of two parts ($f$) ($g$). The parts ($f$) are permanently attached to the shafts, but the parts ($g$) are placed lonely on the shafts and have spiral springs ($h$) bearing against them, the springs ($h$) being placed on the shafts L L. The cord ($b$) that passes around the pulley of the upper shaft L is crossed, the stripping rollers are of concave form or have concave peripheries and radial flanches ($i$) are fitted in them, said flanches being constructed of india rubber or other suitable elastic material. The parts ($f$) of the stripping roller have pins ($j$) attached to the inner sides of the parts ($g$) the pins connecting the two parts of the rollers together. Directly back of the stripping rollers there is placed a gate or vertical frame M. This gate or frame works through the top plate or platform N of the frame A and through a horizontal plate O attached to the frame A below the plate or platform N. The gate or frame has a knife P fitted in its upper part and a stationary concave knife Q is attached vertically to the platform N directly behind the stripping rollers and in line with the knife P. To the lower end of the gate or frame M there is pivoted a pendent R. This pendent has a catch ($k$) on its lower end and a small spring ($l$) bears against the upper end of the pendent, said spring having a tendency to keep the catch ($k$) in gear with the teeth ($a$) on the wheel D.

S is a spring which acts against the gate or frame M, said spring having a tendency to keep it in an elevated state.

T is a vertical bar which passes through the platform N and plate O. This bar has an elastic or yielding pin ($m$) at its lower part which pin fits in a zigzag slot or groove ($n$) in the pendent R.

U is a spring which acts against the bar T, and V is an inclined or beveled projection which is attached to the frame A.

W, W, are the feed rollers one of which is attached permanently to uprights on the platform N, and the other is attached to a bar or lever X the back end of which works on the rod or shaft Y' on the frame A. The lower roller is driven by a belt ($a'$) from the shaft B and the lower roller or both of them may be covered with an elastic material to prevent the corn being shelled from the cobs.

Y is an inclined spout placed in the frame A, the upper end of the spout being placed near the rollers W, W.

Z is a trough or box placed at the front end of the frame A.

The operation is as follows: Motion being given the treadle G by the foot, the stripping rollers are rotated in the direction indicated by the arrows see Fig. 1. The ear of corn is forced between the stripping rollers by the operator, and the elastic flanches (*i*) will strip the husks from the ear. The butt of the ear after it has passed between the stripping rollers, bears down or depresses the bar T and the pin (*m*) will be freed below the slot (*n*) in the pendent R. The spring (*l*) is then permitted to throw the catch (*k*) at the lower end of the pendent in contact with the teeth (*a*) on the wheel D and the wheel D will draw down the gate or frame M, the knife P cutting the ear off from the stalk. When the knife Q and gate or frame is drawn down a certain distance, sufficiently far to allow the knife P to pass the knife Q, the lower end of the catch (*k*) will strike against the projection V and the catch will be thrown free from the teeth (*a*) on the wheel D and the gate or frame M will be raised to its original position by the spring S. The ears of corn after being cut off from the stalk are fed by the rollers W W, into the inclined spout Y and fall upon the ground.

The above machine operates rapidly and well, much labor is saved by its use, there are no parts liable to get out of repair, and it is not expensive to manufacture.

Having thus described my invention what I claim as new and desire to secure by Letters Patent is,

1. The two stripping rollers A constructed and arranged as shown in combination with the cutting device formed of the gate or frame M with the knife P attached and the stationary knife Q on the platform N, the frame M being operated substantially as shown whereby the husks are stripped from the ears and the ears cut from the stalks.

2. I further claim in combination with the stripping rollers and cutting device the rollers W W by which the ears are fed or guided into the inclined spout Y as described.

OREN STODDARD.

Witnesses:
  A. F. CARPENTER,
  LORENZO MATTHEW.